US012580384B2

(12) United States Patent
Vyakaranam et al.

(10) Patent No.: US 12,580,384 B2
(45) Date of Patent: Mar. 17, 2026

(54) AUTOMATION TOOL TO CREATE CHRONOLOGICAL AC POWER FLOW CASES FOR LARGE INTERCONNECTED SYSTEMS

(71) Applicant: Battelle Memorial Institute, Richland, WA (US)

(72) Inventors: Bharat GNVSR Vyakaranam, Redmond, WA (US); Tony B. Nguyen, Richland, WA (US); Quan H. Nguyen, Richland, WA (US); Nader A. Samaan, Richland, WA (US); Mallikarjuna R. Vallem, Richland, WA (US); Renke Huang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1170 days.

(21) Appl. No.: 17/518,478

(22) Filed: Nov. 3, 2021

(65) Prior Publication Data

US 2022/0140601 A1 May 5, 2022

Related U.S. Application Data

(60) Provisional application No. 63/108,918, filed on Nov. 3, 2020.

(51) Int. Cl.
*H02J 3/00* (2006.01)
*G06F 30/20* (2020.01)
(Continued)

(52) U.S. Cl.
CPC .............. *H02J 3/003* (2020.01); *G06F 30/20* (2020.01); *G06Q 10/06* (2013.01); *H02J 3/06* (2013.01);
(Continued)

(58) Field of Classification Search
CPC ...... H02J 3/003; H02J 3/06; H02J 3/46; H02J 2203/20; G06F 30/20; G06F 2113/04; G06Q 10/06
See application file for complete search history.

(56) References Cited

U.S. PATENT DOCUMENTS 9,058,444 B2 * 6/2015 Ghosh ..................... G06F 30/20
10,296,988 B2 * 5/2019 Mitra ..................... G06Q 50/06
(Continued)

OTHER PUBLICATIONS

Liang, Y. & Chen, D. "Fast Large-scale Optimal Power Flow Analysis for Smart Grid through Network Reduction" IEEE 19th Asia & South Pacific Design Automation Conf. (2014) (Year: 2014).*

(Continued)

*Primary Examiner* — Jay Hann
(74) *Attorney, Agent, or Firm* — Klarquist Sparkman, LLP

(57) ABSTRACT

A computer-implemented method includes extending simulation results and input data of a DC production cost model (PCM) of a power grid to an initial AC power flow model (PFM) using a generation distribution mapping and load distribution mapping of a related PFM base example associated with the PCM, and automatically producing a chronological series of converged AC PFM solutions associated with a PCM time series by, for each time step of the PCM time series: (i) updating inputs of an AC PFM using (a) PCM results of the current time step and (b) solution outputs of a converged AC PFM obtained from a previous PCM time step, and (ii) iteratively, reducing nodal loads by a gradual amount configured to account for power grid power flow losses unaccounted for by the PCM and performing AC PFM numerical analyses, until: (a) an AC PFM convergence is obtained and (b) a real power generation slack bus is less (Continued)

than or equal to a predefined tolerance in relation to a slack bus of the PCM results of the current time step.

22 Claims, 9 Drawing Sheets

(51) Int. Cl.
*G06F 113/04* (2020.01)
*G06Q 10/06* (2023.01)
*H02J 3/06* (2006.01)

(52) U.S. Cl.
CPC ....... *G06F 2113/04* (2020.01); *H02J 2203/20* (2020.01)

(56) References Cited

U.S. PATENT DOCUMENTS

| | | | | |
|---|---|---|---|---|
| 10,770,899 B2 * | 9/2020 | Sheble | ...................... | H02J 3/14 |
| 2012/0022713 A1 * | 1/2012 | Deaver, Sr. | ............ | G05B 17/02 700/298 |
| 2016/0254669 A1 * | 9/2016 | Zhang | ................... | B29C 64/227 363/35 |
| 2018/0158152 A1 * | 6/2018 | Jereminov | ................ | H02J 3/16 |

OTHER PUBLICATIONS

Zhang, L., et al. "Coordinated Day-Ahead Reactive Power Dispatch in Distribution Network Based on Real Power Forecast Errors" IEEE Transactions on Power Systems, vol. 31, No. 3, pp. 2472-2480 (2016) (Year: 2016).*

Cvijić, S., et al. "Using Extended AC Optimal Power Flow for Effective Decision Making" IEEE PES Innovative Smart Grid Tech. Conf. Europe (2018) available from <https://ieeexplore.ieee.org/abstract/document/8571792> (Year: 2018).*

Tang, Y., et al. "Real-Time Optimal Power Flow" IEEE Transactions on Smart Grid, vol. 8, No. 6, pp. 2963-2973 (2017) (Year: 2017).*

Liu, Y., et al. "Real-time Dispatchable Region of Renewable Generation Constrained by Reactive Power and Voltage Profiles in AC Power Networks" CSEE J. Power & Energy Sys., vol. 6, No. 3 (Sep. 2020) (Year: 2020).*

Giorgio, A., et al. "Real Time Optimal Power Flow integrating Large Scale Storage Devices and Wind Generation" Mediterranean Conf. on Control & Automation (2015) (Year: 2015).*

"2021 Data Preparation Manual: For Interconnection-Wide Cases." WECC, 56 pages, https://www.wecc.org/Reliability/2021%20DPM.pdf>, downloaded Nov. 3, 2021.

Abe et al., "Load Flow Convergence in the Vicinity of a Voltage Stability Limit," *IEEE Transactions on Power Apparatus and Systems*, PAS-97(6):1983-1993 (Nov./Dec. 1978).

"Anchor Data Set (ADS) Process Guide," ADS Task Force, WECC, Version 3.2, https://www.wecc.org/_layouts/15/WopiFrame.aspx?sourcedoc=/Reliability/ADS%20Process%20Guide%20Version.pdf, 33 pages (Oct. 16, 2019).

Doyle, "Magnetization reversal in films with biaxial anisotropy," *IEEE Transactions on Magnetics*, 2(2):68-73 (Jun. 1966).

Glover et al., Power System Analysis and Design, 5th ed. Stamford, CT, USA: Cengage Learning (2011).

"GridView," Hitachi Energy, https://www.hitachienergy.com/offering/product-and-system/energy-planning-trading/market-analysis/gridview, 2 pages. Downloaded Oct. 27, 2021.

Guimarães et al., "QV and PV curves as a Planning Tool of Analysis," 4th Int. Conf. Electr. Utility Deregulation Restructuring Power Technology, Shangdong, CN, pp. 6-9 (Jul. 2011). https://ieeexplore.ieee.org/document/5994153.

Jensen et al., "Changes to System Inertia with High Renewable Implementation," *WECC*, 48 pages, https://www.wecc.org/Reliability/2019%20Changes%20to%20System%20Inertia%20with%20High%20Renewable%20Implementation%20(SITF)%20Reliability%20Assessment%20Report_2-10-2020_Final.pdf (Feb. 10, 2020).

"Joint Transmission Planning Base Case Preparation Process," NERC Reliability Standard MOD-032-1; Version 1.6, 74 pages, (Dec. 23, 2020).

Leite da Silva et al., "Chronological Power Plow for Planning Transmission Systems Considering Intermittent Sources," IEEE Transactions on Power Systems, 27(4):2314-2322 (Nov. 2012).

"MISO Transmission Expansion Plan 2011," filed with the Iowa Utilities Board on Mar. 31, 2017, E-22269, 123 pages, https://wcc.efs.iowa.gov/cs/idcplg?IdcService=GET_FILE&dDocName=1619317&allowInterrupt=1&noSaveAs=1&RevisionSelectionMethod=LatestReleased.

Mohn et al., "Tracing PV and QV Curves With the Help of a CRIC Continuation Method," *IEEE Transactions on Power Systems*, 21(3):1115-1122 (Aug. 2006).

Samaan et al., "Three-stage production cost modeling approach for evaluating the benefits of intra-hour scheduling between balancing authorities," presented at the IEEE Power Energy Soc. Gen. Meeting, Denver, CO, https://ieeexplore.ieee.org/document/7286647>, 5 pages (Jul. 2015).

"Sustainability is an integral part of our business—it's in our DNA," Siemens, 8 pages, https://www.siemens.com/global/en.html, downloaded Nov. 3, 2021.

"The visual approach to electric power systems," PowerWorld Corporation, https://www.powerworld.com/, 3 pages, downloaded Nov. 3, 2021.

Tinney et al., "Power Flow Solution by Newton's Method," *IEEE Transactions on Power Apparatus and Systems*, PAS-86(11):1449-1460 (Nov. 1967).

Tripathy et al., "Load-Flow Solutions for Ill-Conditioned Power Systems by a Newton-Like Method," *IEEE Transactions on Power Apparatus and Systems*, PAS-101(10):3648-3657 (Oct. 1982).

Vyakaranam et al., "Automated Tool to Create Chronological AC Power Flow Cases for Large Interconnected Systems," *IEEE Open Access Journal of Power and Energy*, 8:166-174 (Apr. 26, 2021).

Vyakaranam et al., "Novel Data-Driven Distributed Learning Framework for Solving AC Power Flow for Large Interconnected Systems," *IEEE Open Access Journal of Power and Energy*, 8:281-292 (Jul. 12, 2021).

Samaan et al., "Analysis of Benefits of an Energy Imbalance Market in the NWPP," Pacific Northwest National Laboratory, Richland, WA, Tech. Rep. PNNL-22877, https://www.pnnl.gov/main/publications/external/technical_reports/PNNL-22877.pdf, 294 pages (Oct. 2013).

Samaan, et al., "Deploying Intra-Hour Uncertainty Analysis Tools to ABB's GridView—CRADA 445," PNNL-SA-160084, Richland, WA: Pacific Northwest National Laboratory, 5 pages (Oct. 29, 2021).

Transmission Planning Technical Guide; ISO New England Inc. System Planning; Revision: 7.0., Sep. 30, 2021, https://www.isone.com/static-assets/documents/2021/09/transmission_planning_technical_guide_rev7.pdf.

\* cited by examiner

500

COMPUTING ENVIRONMENT 1000

1030 central processing unit 1010 graphics or co-processing unit 1015

MEMORY 1020

MEMORY 1025

COMMUNICATION CONNECTION(S) 1070

INPUT DEVICE(S) 1050

OUTPUT DEVICE(S) 1060

STORAGE 1040

AUTOMATION TOOL TO CREATE CHRONOLOGICAL AC POWER FLOW CASES FOR LARGE INTERCONNECTED SYSTEMS

CROSS REFERENCE TO RELATED APPLICATION

This application claims priority to U.S. Provisional Patent Application No. 63/108,918, filed Nov. 3, 2020, and is incorporated by reference herein.

ACKNOWLEDGMENT OF GOVERNMENT SUPPORT

This invention was made with Government support under Contract DE-AC0576RL01830 awarded by the U.S. Department of Energy. The Government has certain rights in the invention. The government has certain rights in the invention.

FIELD

The field is electrical power grid analysis and management.

BACKGROUND

Electric power systems include interconnections that should be suitable for future generation and transmission options as well as present conditions. For planning, electrical power grid planners at the interconnection level often produce a few snapshots of the system, which can be referred to as base power-flow cases. In modern power systems, which typically operate based on intricate sub-hourly transactions among balancing authorities (B As) and intermittent renewable generation, this small number of base power-flow cases is generally insufficient for informing transmission planners of operational impacts like voltage stability. It is desirable to have data sets and tools that will provide grid planners the ability to examine the solutions of thousands of chronological power-flow (CPF) cases to understand operational impacts. Data sets that contain such high-resolution chronological data for the Western Electricity Coordinating Council (WECC)-wide systems in both production cost and AC power-flow models (PFMs) would enable detailed operational analysis in planning studies. These models can provide insights for effects of renewables on generation and transmission systems within the operation hour and facilitate the development of integration tools. CPF is also used in transmission planning to calculate performance indices for systems with high renewable penetration.

Production cost modeling (PCM) can be an essential tool for power systems planning engineers. Few commercial tools are available that can handle full interconnections with thousands of substations. Successfully feeding the dispatch of a PCM to power-flow models (PFMs) successfully is recognized as a challenging problem that has yet to be fully resolved. Thus, a need remains for tools for relating PCMs and PFMs.

SUMMARY

According to an aspect of the disclosed technology, computer-implemented methods include extending simulation results and input data of a DC production cost model (PCM) of a power grid to an initial AC power flow model (PFM) using a generation distribution mapping and load distribution mapping of a related PFM base example associated with the PCM; and automatically producing a chronological series of converged AC PFM solutions associated with a PCM time series by, for each time step of the PCM time series: (i) updating inputs of an AC PFM using (a) PCM results of the current time step and (b) solution outputs of a converged AC PFM obtained from a previous PCM time step, and (ii) iteratively, reducing nodal loads by a gradual amount configured to account for power grid power flow losses unaccounted for by the PCM and performing AC PFM numerical analyses, until: (a) an AC PFM convergence is obtained and (b) a real power generation slack bus is less than or equal to a predefined tolerance in relation to a slack bus of the PCM results of the current time step. In representative examples, the automatically producing the chronological series of AC PFM solutions associated with a PCM time series by, for each time step of the PCM time series, further includes, in response to the converged AC PFM: scanning all bus voltages to identify voltage violations, and, for each voltage violation, identifying existing shunts at corresponding or nearby buses and adjusting dispatch of the identified shunt devices based on a level of the voltage violation and step sizes of the identified shunt devices to reduce or eliminate the voltage violation. Some examples further include, for voltage violations remaining after identification and adjustment of existing shunts, identifying locations and sizes of shunts to be added to the power grid by performing a Q-V analysis configured to show sensitivity and variation of bus voltages with respect to reactive power injections or absorptions. In some examples, the identification of the locations and sizes of shunts to be added to the power grid by performing a Q-V analysis includes: arranging remaining unresolved voltage violations in descending order, and for each voltage violation beginning with top, performing Q-V analysis to determine $Q_{TOT}$ required to reduce alleviate voltage violation, adjust nearby shunts based on $Q_{TOT}$, and add new shunts if $Q_{TOT}$ is nonzero after shunt adjustments. In some examples, the extension of simulation results and input data of the PCM to the PFM comprises: disaggregating power generation and load from a power plant level and balancing authority level, respectively, to the nodal level of the PFM, and updating the PFM at a nodal level (i) by sending unit commitment and economic dispatch for generation units, HVDC dispatch, transformer phase angles, and transmission line status from the PCM simulation results to PFM nodes according to the generation distribution mapping and (ii) by sending balancing authority load data to PFM nodes according to the load distribution mapping. In some examples, the updating the PFM at a nodal level by sending PCM simulation results to PFM nodes according to the generation distribution mapping includes, with the status of each unit of the PFM for a plant i being similar to the status of the power plant i in the PCM simulation results, calculating unit dispatch for each unit k in plant i from plant dispatch and updating the PFM nodes using a constant generation distribution factor (GDF), where (GDF) is calculated from a dispatch provided in the PFM base example. In some examples, the updating the PFM at a nodal level by sending PCM simulation results to PFM nodes according to the load distribution mapping includes calculating nodal load data in the PFM using balancing authority load data from the PCM using a load distribution factor calculated from a nodal load value mapping in the PFM base example. In some examples, a reactive power in the PFM is calculated such that the power factor of the nodal loads in the PFM are equal to the PFM base example so as to compensate for a lack of information about the reactive part of the nodal loads in the PCM. Some examples include, after the extending simulation results and input data of the PCM to the PFM, verifying a consistency between parameters of the PCM and the PFM by confirming a one-to-one match for transmission line ID, status, and/or rating for any transmission lines in the PCM and PFM. In some examples, the iteratively reducing nodal loads by a gradual amount until a real power generation slack bus is less than or equal to a predefined tolerance in relation to a slack bus of the PCM results of the current time step includes using an adaptive step size configured to reduce the amount of reduction in the nodal loads for the next iteration to assist with simultaneously satisfying convergence and the slack bus condition. In representative examples, the PCM is configured to simulate a chronological security-constrained unit commitment and economic dispatch for an electrical power grid over the PCM time series, and to produce an optimization output of a lowest-cost generation dispatch that satisfies a set of constraints, and the constraints include power generator constraints including minimum/maximum capacity, ramp rate, heat rate, down/up time limits, and/or fuel limit, network constraints including minimum/maximum bus voltage and/or line flow limit, operational constraints including stability limits, and/or environmental constraints including emission limits. In some examples, inputs to the PCM include load forecast, wind forecast, solar forecast, generator fleet characteristics, fuel prices, network topology, and/or the set of constraints. In further examples, the outputs of the PCM include chronological production and associated cost, locational marginal price, and/or congestion cost, in an hourly and/or sub-hourly time-series. In many examples, the PFM includes a numerical analysis having inputs including real and reactive power load, generator real power, and bus voltage magnitude, and having outputs including bus voltage magnitudes and angles so as to provide a solution with detailed transmission voltages and power flows based on the specified inputs. Some examples further include updating network topology used in the PCM based on a network topology change determined from the PFM time series generated for the PCM. Some examples further include, in response to a convergence difficulty observed during the iteration, updating inputs of the AC PFM using (a) PCM results of the current time step and (b) solution outputs of a converged AC PFM obtained from an alternative source different from the previous PCM time step. In some examples, the alternative source includes a converged PFM selected from a set of converged PFM examples. Some examples further include, before automatically producing the chronological series, verifying a consistency between the PCM and the PFM by comparing a DC power flow of the PCM simulation results to the PFM, by comparing line flow values.

According to further aspect of the disclosed technology, computer-implemented automated tools, include a processor and memory configured with instructions for the processor which cause the processor to perform any of the automated methods described above.

According to a further aspect of the disclosed technology, computer readable media include stored processor executable instructions configured to perform any of the automated methods described above.

The foregoing and other objects, features, and advantages of the disclosed technology will become more apparent from the following detailed description, which proceeds with reference to the accompanying figures.

DETAILED DESCRIPTION

Introduction to the Disclosed Technology

Figure 1:
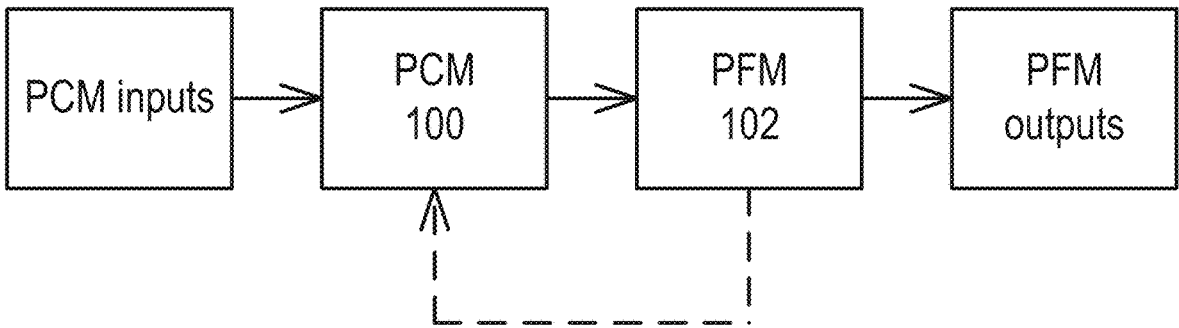
FIG. 1 is a schematic of a process connecting a production cost model (PCM) and AC power flow models (PFMs).

The contents of the article by Vyakaranam et al. entitled "Automated Tool to Create Chronological AC Power Flow Cases for Large Interconnected Systems," IEEE Open Access Journal of Power Energy, DOI: 10.1109/OAJPE.2021.3075659, April 2021, is incorporated by reference herein.

As mentioned above, power system planning engineers currently perform planning studies based on a few snap shots representing typical system operating points, also known as base power flow cases. However, these few snap shots are generally insufficient to fully understand and evaluate operational impacts of the current and future grid, especially under high uncertainty and extreme events. Thus, it can be necessary to consider time series analysis as opposed to picking a small number of selected operating conditions. Examples of the disclosed technology use the Production Cost Model (PCM) simulation data for various wind, PV, and load levels to generate chronological hourly power flow cases. Because the PCM typically uses a lossless and linear DC power-flow solution for simulations and the reliability of actual power grids depend upon the operational characteristics of alternating-current (AC) power flow, convergence to AC power flow is needed to enable reliability planning studies. Disclosed examples enable such reliability studies with procedures and methodologies configured to handle losses and provide reactive power planning through automated processes that can be used for large interconnected systems.

In disclosed examples, procedures and tools translate data sets between PCMs and PFMs and create chronological AC power flow cases. In representative examples, processes are automated, with options to provide results in various formats. For example, automation tools can create chronological power-flow models (PFM) in GE PSLF, Siemens PTI PSSE, and/or PowerWorld formats. The developed tools and procedures can be applicable to various large, interconnected systems such as WECC, the Eastern Interconnection, and the Electric Reliability Council of Texas (ERCOT). Disclosed examples also can facilitate interconnection of new renewable generation, thereby helping achieve national renewable targets, and improving system reliability. Successfully feeding a PCM dispatch to power flow models is a challenging problem in the power industry which has not been adequately resolved, as the associated difficulty exists for numerous reasons.

To successfully feed a PCM dispatch to PFMs, a power grid system topology should be consistent between the PCM and PFM. In a first step, because the PCM solves the optimization problem using a direct-current (DC) model and a linear solver, bus voltages are not considered in the solution. Another factor that affects the solution is the system loss. In PCM, the loss is estimated and added to the load, whereas in the AC power flow, the loss is calculated during the power flow solution. Also, because the reactive power load and generation are typically ignored in the PCM but fully considered in the AC power flow, assumptions must be made about them when solving the chronological PFMs. Also, distribution of area load to the bus level in PCM is fixed during the entire simulation period. The load distribution factors are typically calculated once based on a reference power flow case and then used for all hours. While this may be permissible in PCM because the bus voltages are not considered, it is generally not permissible in the AC power flow model because the bus load distribution and voltage profiles can vary significantly between seasons. Such factors together create a challenge for importing and solving the chronological AC power flow. Normally the entirety of such a process may take a few hours to days to create a base AC converged power flow case, as it involves production cost modeling, AC convergence, and reactive power planning. Examples of the disclosed technology can address these challenges with automation tools that can fill modelling gaps in dataset translation between PCM and PFM and that can create chronological AC power flow model solutions automatically for a variety of interconnected systems. In particular, disclosed examples can successfully perform the conversion from DC power flow in PCM to AC power flow. Selected examples can also include a round-trip capability to bring system dispatch time series from the PCM into time-sequenced power-flow runs for reliability analysis and also to update PCM network topology based on the PFM runs. In some examples, disclosed methods and tools can produce a converged PFM of a series in 3 to 4 minutes, which is substantially shorter than the days to weeks normally taken in prior convergent power flow model approaches.

Combining planning models with operational details can allow the power industry to proactively investigate future resource and load scenarios, rather than react to their implementation in real time. In representative examples, methods can resolve current challenges in importing and solving the chronological AC power flow using three stages. In a first stage, DC power flow cases are prepared using PCM results, e.g., using methodologies to fill modelling gaps in dataset translation from PCM (e.g., in "GridView" format) to PFM. A second stage can include a DC to AC convergence process. The PCM calculates the generation to match load but does not calculate transmission losses. The PCM assumes losses are distributed proportionally among the loads in each area. To enable reliability planning studies, converged AC power flow solutions are obtained, handling losses and automatically providing reactive power planning.

In a third stage, reactive power planning for voltage improvement is provided. For example, the converged AC power flow case at the second stage can have several voltage violations and voltage profiles can be improved in each case through various procedures, including by performing QV analysis.

Production Cost Modeling

Production cost modeling is an essential tool for power systems planning engineers. Such software simulates the chronological security-constrained unit commitment and economic dispatch; it minimizes the production cost while simultaneously satisfying a wide variety of operating constraints. Constraints considered in PCM optimization can include generator constraints (minimum/maximum capacity, ramp rate, heat rate, down/up time limits, fuel limit, network constraints (minimum/maximum bus voltage, line flow limit), operational constraints (stability limits), and environmental constraints (emission limits). The inputs for a PCM optimization problem include load forecast, wind forecast, solar forecast, generator fleet characteristics, fuel prices, network topology, and constraints. The outputs include chronological production and associated cost, locational marginal price, and congestion cost. Depending on the market structure and data availability, the time-series output can be hourly or subhourly. The intra-hour operation model provides grid operators and planners information to make well-informed decisions in market operations and planning. As a result of this optimization, the output of the operation is the lowest-cost generation dispatch that satisfies all specified constraints.

AC Power Flow and Data for Performing AC CPF

AC power flow is a numerical analysis of the power flow in steady-state operation, e.g., as described in Glover et al., Power System Analysis and Design, 5th ed., 2012, incorporated by reference herein to the extent not inconsistent with the present disclosure. In general, AC power flow model numerical analyses do not include time variables. Inputs include the real and reactive power load, generator real power, and bus voltage magnitude. Outputs include bus voltage magnitudes and angles. The solutions of such numerical analyses can provide detailed transmission voltages and power flows based on the specified inputs. To numerically solve the power flow problem, various iterative methods can be used, e.g., Newton-Raphson, Gauss-Seidel, etc.

Planning studies must consider operational constraints over a wide range of scenarios that could potentially affect the system operation. Therefore, a few snapshots of the system (seasonal base power flow cases, for example) are not sufficient to reflect the operational impact of high penetration of variable generation (wind and solar) or subhourly transactions between balancing authorities (BAs). In addition to the network topology, AC CPF requires bus-level generation and load values for different, sequential time intervals. If a detailed study is needed in a particular area of interest, power flows in the tie lines surrounding that area are also needed.

Although state estimation (SE) data could be used to perform AC CPF analysis, there are several hurdles when using this approach. First, SE data is typically proprietary, and hence difficult to obtain. Second, even if data can be obtained, mapping SE data (from a node-breaker model) to the planning model (in a bus-branch model) is difficult. Lastly, because SE data are current or historical system operating data, it generally cannot be used to analyze future scenarios.

In light of these obstacles to use of SE data, chronological PCM simulation data can be a viable alternative for analyzing detailed system voltage and power flows. Because generation and load (both real and reactive power) are varied sequentially at each time step, AC CPF can be used to evaluate system performance and control, including voltage magnitude changes at load buses, substation capacitor bank switching frequency, substation transformer tap change frequency, activation of remedial action schemes, effects of wind and solar ramping, modeling temporal control actions, effects of distributed photovoltaic generation on transmission voltage regulation, and dynamic scheduling flows.

Planning Study using PCM and PF

For systems with high penetration of wind and solar generation, planners must understand the operational challenges not only for generation dispatch but also for managing transmission voltage and power flows. The planning process requires chronological hourly production cost and AC power-flow models that consider system load at bus level, wind generation, solar generation, corresponding outputs for dispatchable generation, and devices such as those for high voltage, direct current (HVDC) and reactive power support.

Complete planning can include two steps. For example, referring to FIG. 1, in a first step, with given load, wind, and solar forecasts, a PCM tool 100 can provide a chronological hourly dispatch based on generator fleet characteristics, input fuel prices, and specified constraints. In a second step, the hourly dispatch from the first step is fed into AC PFMs 102 to analyze the transmission voltage and power flows. This analysis can also provide information to improve the PCM model, e.g., adjustments to network topology used by the PCM. For example, transmission lines can be added or changed, loads or generation units adjusted, etc. In this way, an updated PCM and associated inputs and/or outputs can be used to produce another chronological series of converged PFMs with a reduced parameter mismatch between PCM and PFM (e.g., with a reduced or eliminated line flow mismatch, as discussed further below).

Examples of Data Mapping and Model Validation of PCM and PFM

Transmission planning studies require a seamless translation from PCM simulation results to power flow cases. Therefore, it is important to understand the similarities and differences between the PCM and PFM, how PCM results are exported to a power flow case, and how to validate the process of updating PCM results to the power flow case. This section discusses each of these aspects.

A PCM model is created based on a given AC-converged power flow case, and it is used for solving the unit commitment (UC) and economic dispatch (ED) problems with the DC optimal power flow method. The PCM and PFM are thus very similar, though there are differences between them. The similarities of the two models are listed in Table 1.

TABLE 1

Parameters used in system similarity verification

| Categories | Parameters |
|---|---|
| Bus | Number of bus |
| Transmission lines | Number of lines |
| | Line ID |
| | Line status |
| | Line ratings |
| Transformers | Number of transformers |
| | Transformer ID |

TABLE 1-continued

Parameters used in system similarity verification

| Categories | Parameters |
|---|---|
| | Transformer status |
| | Transformer rating |
| | Number of HVDC lines |
| HVDC lines | Bus numbers at two ends of HVDC lines |
| | HVDC line status |
| | HVDC line rating |

As shown in Table 1, the similarities between the PCM and PFM are related to the system topology, which is expected. For example, there must be a one-to-one match for transmission line ID, status, and rating for any transmission lines in the two models. Any discrepancies in the quantities shown in Table 1 must be resolved.

Figure 2:
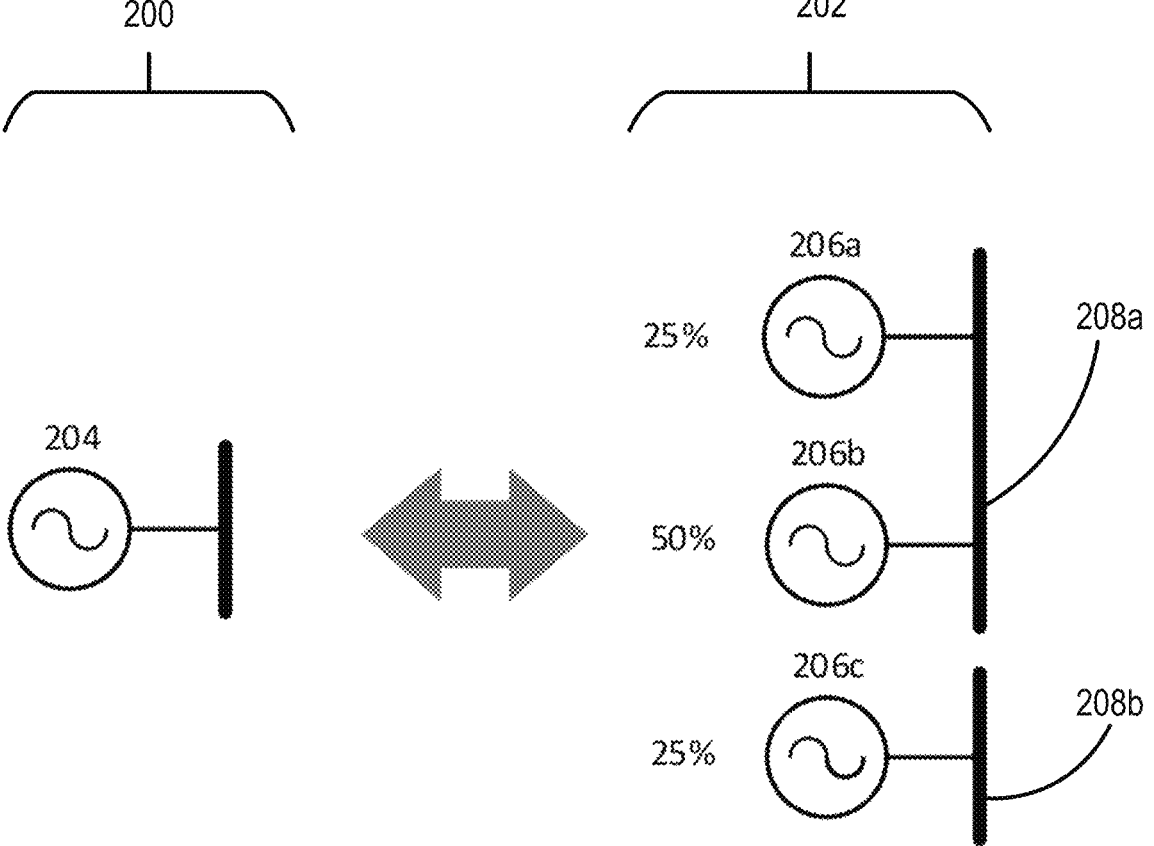
FIG. 2 is a schematic comparing generator modeling in PCM and power flow models.

However, most often the two models are not identical. Specifically, a specific power plant is modeled at plant level in one model while it is modeled at bus level in the other. Generators with different IDs in the power flow model are combined as a single power plant with combined generation capacity in the PCM model. In other words, a single power plant in the PCM model is equivalent to one or more generation units in the original power flow model. This modeling approach in the PCM model facilitates solving the UC and ED problems because it reduces the total number of decision variables. FIG. 2 shows an example of a PCM 200 as related to a PFM 202. In this example, power plant 204 in the PCM 200 is a combination of three separate generation units 206a, 206b, 206c located at two different buses 208a, 208b in the power flow model 202. The input generation distribution factors of these three units are 25%, 50%, and 25% of the generation capacity and dispatch of plant 204.

Modeling load in the PCM is also different from that in the power flow model. Unlike the generator modeling, the load modeling accounts for the input load data. In the power flowcase model, load is specified at a nodal level, and multiple loads can have different IDs at a single bus. In the PCM model, each load bus has only one load. More importantly, load data in a PCM is usually given at the BA level rather than the nodal level, because load forecast is usually performed at the BA level. Before solving the UC and ED problems, a PCM solver disaggregates the net load data from the BA level to the nodal level, using the load distribution factor; this calculation is based on the total BA load and behind-the-meter generation, as described further below.

After obtaining PCM simulation results, nodal-level updates are made to power flow model: the UC and ED for generation units, HVDC dispatch, transformer phase angles, and transmission line status from the PCM results are sent to all equipment at a nodal level in the power flow cases.

As discussed above, a power plant in a PCM can be equivalent to one or more separate units in the power flow case. When the PCM results are exported to a power flow case, the status of each of these units is similar to that of the power plant in the PCM result. In addition, the dispatch $P_{ik}^{gen}$ of unit k in plant i is calculated from plant dispatch $P_i^{plant}$ and updated to the power flow case as follows:

$$P_{ik}^{gen} = P_i^{plant} \text{GDF}_{ik} \qquad (1)$$

where the constant generation distribution factor $\text{GDF}_{ik}$ is calculated from the dispatch $P_{ik}^{gen0}$ given in the base power flow case using (2):

$$GDF_{ik} = \frac{P_{ik}^{gen\,0}}{P_i^{plant\,0}} = \frac{P_{ik}^{gen\,0}}{\sum_{k=1}^{n} P_{ik}^{gen\,0}}, \tag{2}$$

where n is the number of units that belong to power plant i in the PCM model. Because PCM is based on DC power flow, it is important to note that PCM simulation results provide no information about the reactive power dispatch of the generation units.

The nodal load in the power flow model needs to be calculated from the BA load data, which is the input of the PCM simulation. First, the status of the nodal load at one bus is assumed to be unchanged during the time horizon of the planning study. Second, the nodal load $P_{ik}^{load}$ at bus k in BA i is calculated from the corresponding load distribution factor and the net BA load $P_i^{BA,net}$ as follows:

$$P_{ik}^{load} = P_i^{BA,net} LDF_{ik} = (P_i^{BA} - P_i^{BTM}) LDF_{ik}, \tag{3}$$

where the constant load distribution factor $LDF_{ik}$ is calculated based on the nodal load value $P_{ik}^{load0}$ in the original power flow case as shown in (4):

$$LDF_{ik} = \frac{P_{ik}^{load\,0}}{P_i^{BA0}} = \frac{P_{ik}^{load\,0}}{\sum_{k=1}^{m_i} P_{ik}^{load\,0}}, \tag{4}$$

where $m_i$ is the number of loads in BA i. As with the reactive power of generators, PCM does not provide any information about the imaginary part of the nodal load. It is assumed that the reactive power in the exported power flow case is calculated such that the power factor of the load is equal to that in the base power flow case.

Figure 3:
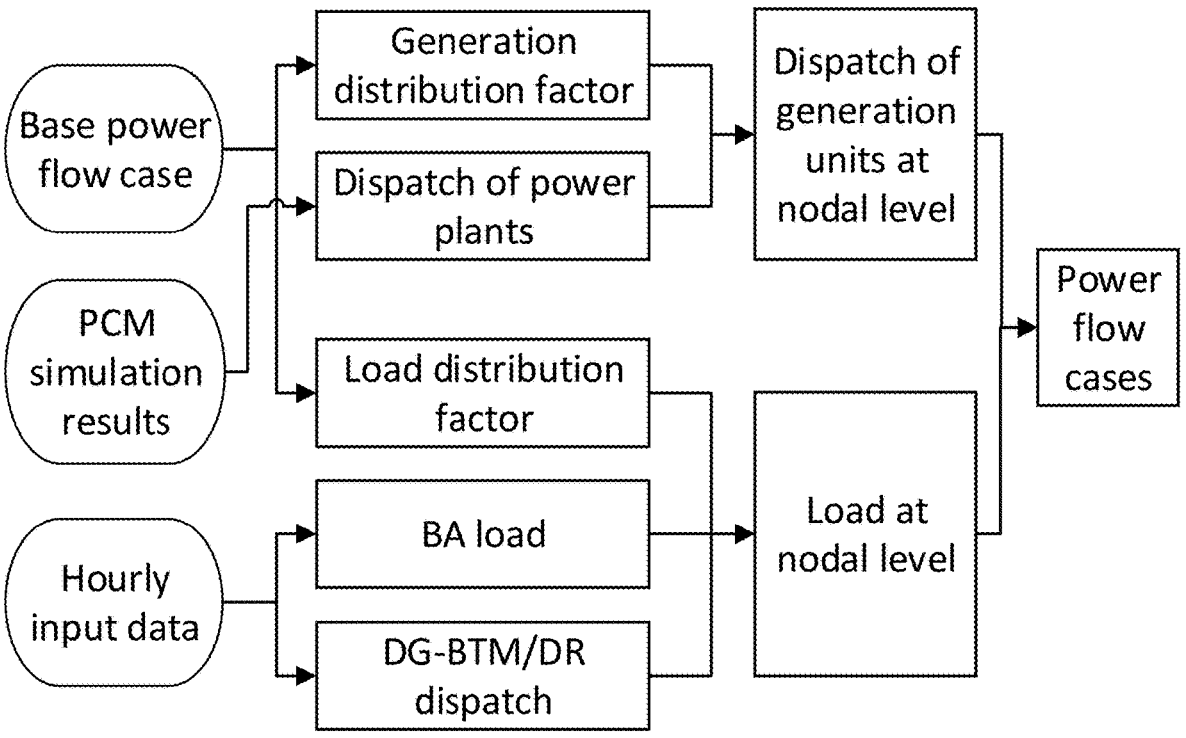
FIG. 3 is a schematic showing a process of disaggregating generation and load from PCM simulation results and extending data to power flow cases.

The process of disaggregating generation and load from power plant level and BA level, respectively, to nodal level is shown in FIG. 3.

Figure 4:
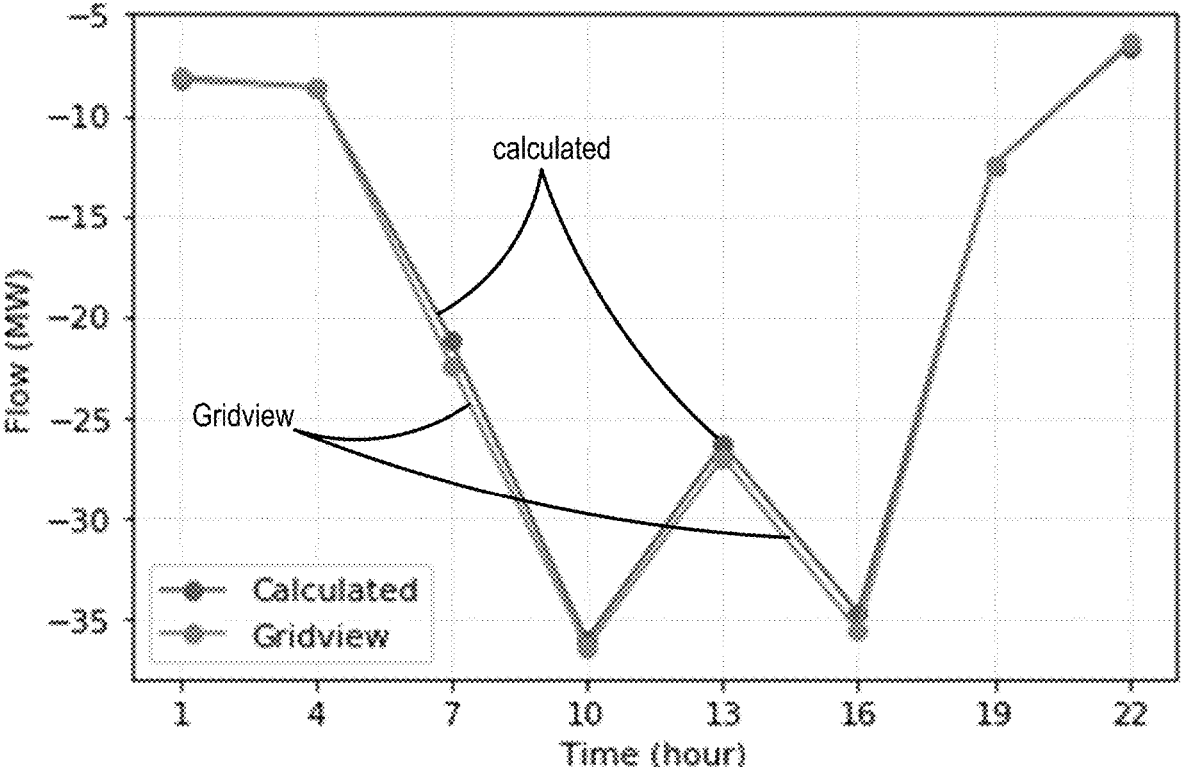
FIG. 4 is graph of a line flow at 8 hours of a transmission line on Jul. 24, 2018 from a PCM result and exported power flow case.

After exporting PCM simulation results to a power flow case, consistency between the PCM model and power models should be verified and, in the data updating process between the PCM and the exported power flow case. Therefore, the DC power flow solution for the PCM result and the exported power flow case are compared. One parameter used in the comparison is line flow. For the WECC interconnection system, Table 2 shows the results of a line flow comparison between the PCM result and the exported power flow case (these values will be changed to mismatch percentages). FIG. 4 shows an example of acceptable consistency in line flow between the PCM result and the exported power flow case.

TABLE 2

| Line flow comparison between PCM result and exported power flow case | |
| --- | --- |
| Mismatch | Number of lines/transformers |
| More than 30 MW | 0 |
| Between 20 and 30 MW | 3 |
| Between 10 and 20 MW | 7 |
| Less than 1 MW | 26614 |

Examples of DC-to-AC Convergence

Figure 5:
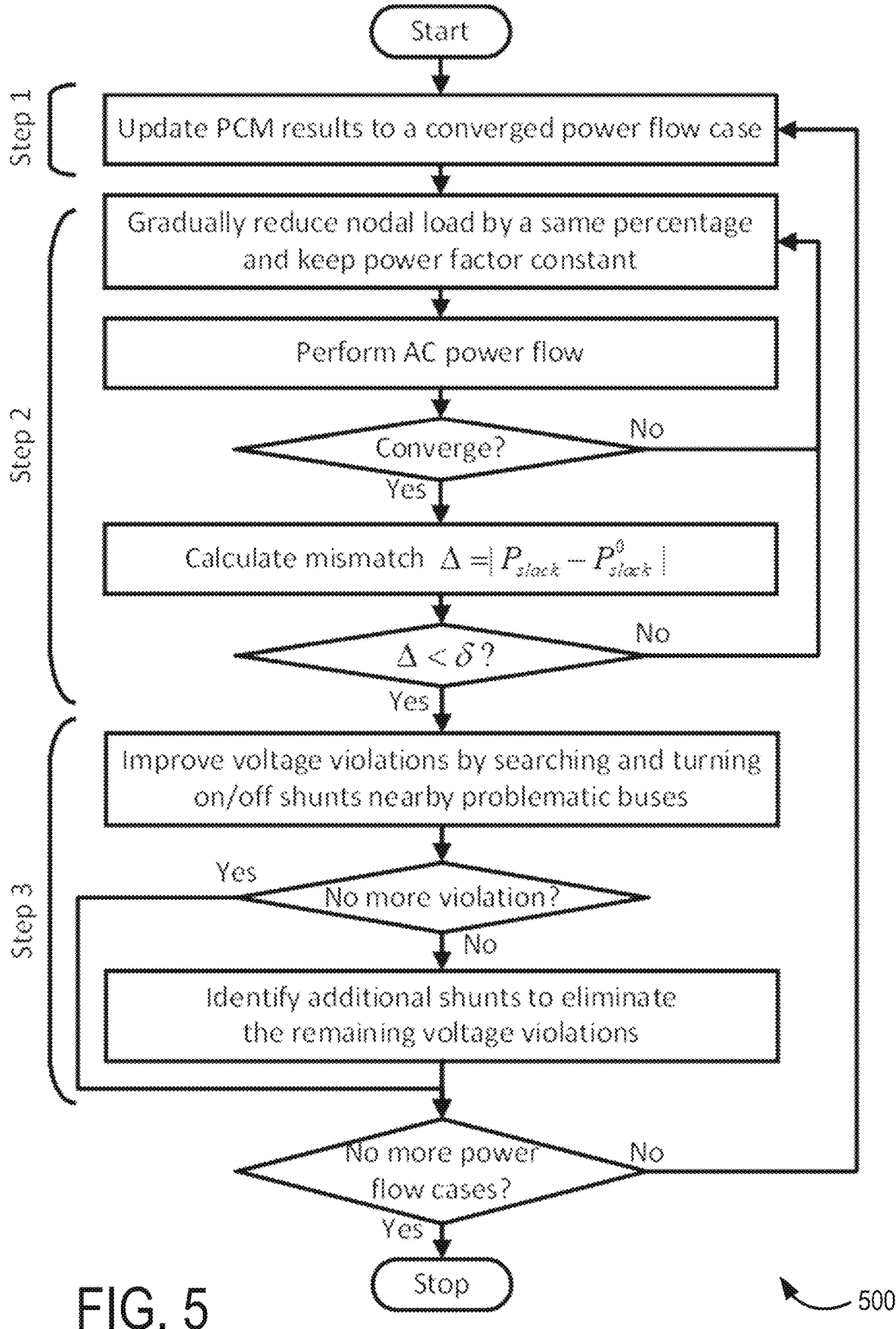
FIG. 5 is a flowchart showing a procedure to convert a DC-converged power flow case from PCM results to an AC-converged power flow case.

FIG. 5 is an example process 500 of DC-to-AC convergence in a PFM. In a Step 1, a new PCM result is updated to an AC-converged power flow case obtained from a previous time step. This association can be selected because the loading conditions of the two consecutive power flow cases are usually close to each other, so the voltage of the AC-converged power flow case in the previous time step is a good starting point for solving power flow in the new power flow case. As shown, losses are not considered in the PCM model. Because PCM uses DC power flow, the total generation is equal to the total load in the new power flow case. In some examples, it can be assumed that the dispatch of all generation units, including the unit at the slack bus, is fixed, as in PCM results. Therefore, nodal loads are reduced to account for transmission losses when converting DC to AC power flow cases. As a result, in a Step 2 of the convergence process 500, nodal loads are iteratively reduced before AC power flow is performed. If power flow does not converge, load is further reduced. If power flow converges, the resulting real power generation $P_{slack}$ at the slack bus is compared with the original value $P^0_{slack}$ in the PCM result. If the difference $\Delta^k$ at iteration k is greater than a predefined tolerance $\delta$, load is further reduced; otherwise, the load reducing process is considered done. It is worth mentioning that an adaptive step size $\mu^{k+1}$ at iteration (k+1) based on the slack generation difference $\Delta^k$ at iteration k is used to iteratively reduce the load as follows:

$$\mu^{k+1} = \Delta^k \sigma = |P_{slack}^k - P_{slack}^0| \sigma, \tag{5}$$

where $\sigma$ is a constant coefficient.

In the above steps, AC convergence is the main focus. After achieving an AC-converged power flow case, the priority shifts to improving the bus voltage profile. Improving voltage after getting AC convergence is crucial, because a good voltage profile at one time step directly affects the possibility of achieving AC convergence in the subsequent time steps, as discussed further below. Therefore, in a Step 3 of the convergence process 500, all bus voltages are scanned to identify voltage violations. Then, each bus with a voltage violation is processed, and the existing shunts at this bus or nearby buses are identified. The dispatch of these shunt devices is turned on/off or adjusted based on the level of voltage violation and the shunt step sizes.

After a bus voltage violation is mitigated by using the existing shunts in the system, another voltage violation check is conducted to identify the remaining violations. If the voltage violation is not completely resolved, another voltage improvement process based on Q-V analysis is carried out to identify the locations and sizes of shunts to be added to the system, as discussed further below.

After improving the voltage profile using the existing and additional shunts, the resulting power flow case can be considered the final AC-converged power flow case for the current time step. The entire procedure of converting DC power flow from PCM results to an AC-converged power flow case, e.g., as shown in FIG. 5, can be repeated until all time steps are processed.

Because power system planning requires AC-converged power flow cases, the power flow case with PCM results obtained previously must be converted to an AC-converged case. This section proposes an effective procedure for such a conversion. As mentioned previously, the PCM results do not provide any information about the reactive power dispatch of generators. The actual reactive power dispatch of generators in a power system is traditionally determined by solving power flow. The power flow algorithms, such as the Newton-Raphson method, use a flat start or use the operating point of a converged power flow case as the starting point.

However, in a large-scale power system such as the WECC interconnection, obtaining the power flow convergence is challenging. From the power system point of view, it is hard to come up with a dispatch for each generator that provides enough reactive power while maintaining a stable voltage profile for all buses in the system. Mathematically, the power flow in such a large system is usually ill-conditioned, i.e., a small change in the demand can give rise to a significant change in the state, i.e., voltage profile, of the system. Therefore, using a flat start or the solution of a previously converged power flow case might not be efficient if that solution is far from the solution of the current power flow case. In addition, if there are voltage violations at several buses, the algorithm is likely to converge to an unstable solution.

In transmission planning, ample reactive power resources must be planned to meet reliability requirements under a broad range of feasible contingencies. Reactive power is an essential reliability service to the bulk power system. It is supplied by generators, capacitors, transmission lines, and load. It is consumed by loads, transmission lines, and transformers. Voltage magnitude and reactive power are tightly coupled. It is always important to maintain voltage within an acceptable range; this can be achieved with proper reactive power planning.

Figure 6:
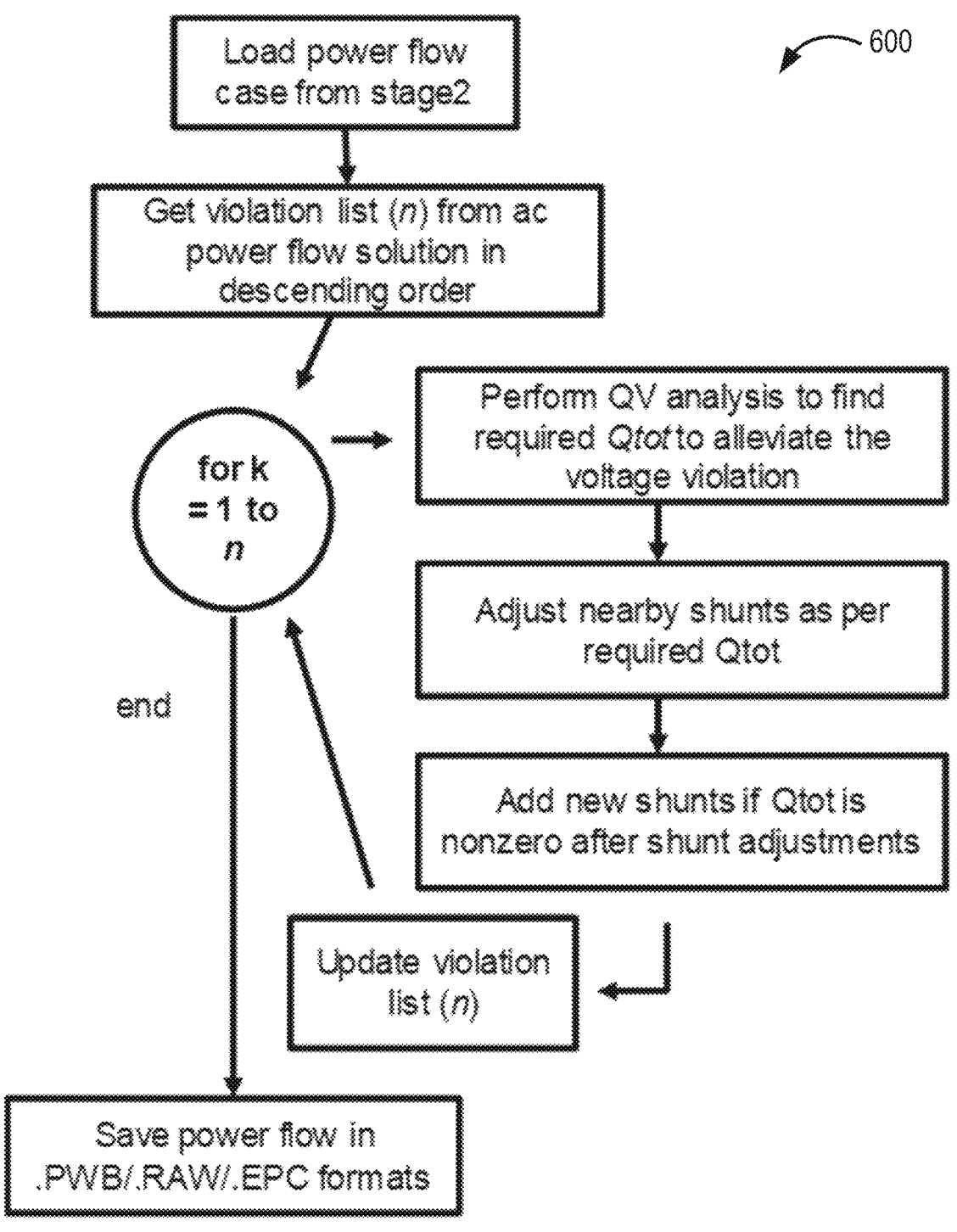
FIG. 6 is a flowchart schematic of an example reactive power planning strategy to improve voltage profile.

The converged AC power flow case at Stage 2 may have several voltage violations, and voltage profiles of each must be mitigated. FIG. 6 shows an example process 600 that can achieve improvement in voltage profiles by performing Q-V analysis, showing the sensitivity and variation of bus voltages with respect to reactive power injections or absorptions. The approach here is to improve voltage profile incrementally with reasonable reactive power support devices. Example Q-V analyses include those described in Guimarães et al., "QV and PV curves as a planning tool of analysis," presented at the 4th Int. Conf. Electr. Utility Deregulation Restructuring Power Technol., Shangdong, China, pp. 6-9 Jul. 2011, and Mohn et al., "Tracing PV and QV curves with the help of a CRIC continuation method," IEEE Trans. Power Syst., vol. 21, no. 3, pp. 1115-1122, August 2006, and incorporated by reference herein to the extent not inconsistent with the present disclosure.

The reactive power planning algorithm starts by loading the power flow case from Stage 2 and extracting voltage-out-of-range violations for higher voltages. Experiment examples focused on base voltages higher than 230 kV; however, the disclosed methods are general and could be applied to any voltage levels. For the first stage, the algorithm sorts the violation list in descending order of voltage and performs Q-V analysis for the most violated bus to find the required reactive power support ($Q_{tot}$) to alleviate the voltage violation. Next, it searches for shunts near the most violated bus, such as capacitors and reactors, if present, then adjusts the shunt reactive power device(s) as per the required $Q_{tot}$ value and update $Q_{tot}$. If $Q_{tot}$ is nonzero after shunt adjustments, it adds a new shunt. Then, it solves the power flow and extracts a violation list. During this process, when the simulator fails to converge at a particular transfer level, that bus is skipped. Otherwise, this process continues until the violation list is empty. This approach improves voltage profile incrementally with reasonable reactive power support devices, it could fix flow violations to an extent. The flow violations can be alleviated by doing generation redispatch, but it was not implemented as we do not want to change the PCM generation dispatch at any hour. Finally, it saves the power flow case with the better voltage profile in formats such as .pwb of PowerWorld, .raw of PSS/E, and .epc of PSLF.

Example Power Grid Case Study

This section examines a case study to show the efficacy of the proposed DC-to-AC power flow conversion and reactive power planning described herein. The system used in this study is the WECC 2028 ADS case, which has 22,509 buses, 4,417 generators, 11,126 load buses, and 1,766 transmission lines. The DC PFMs from the PCM simulation result and the exported power flow case are verified to be identical. A GridView tool is used for PCM simulations. In the following description, the time stamp is the hourly index during the year. The starting power flow case is the summer peak, which is at 2 p.m. on July 24, corresponding to hour index 4934. It is assumed that power flow converges for this hour. The steps are described can correspond to those shown in the convergence process 500.

At a first step, the PCM simulation result for hour 4935 is updated to the converged power flow case at hour 4934. Note that only the generation dispatch, load, transformer angle, and HVDC dispatch are updated. The voltage in the resulting power flow case is the same as in the power flow solution for hour 4934.

At a second step, this step aims to achieve AC power flow convergence for the power flow case obtained from the first step. To reduce computational time, all loads are initially started from 98% of the original load in the first step. Next, the loads are iteratively reduced, with an adaptive size calculated from III-E, and power flow is performed. The original dispatch of the slack bus from Step 1 is 437.38 MW. Note that AC power flow might not converge at the beginning of this step, but rather when the load level is sufficiently decreased.

Table 3 shows the resulting dispatch of the slack generator corresponding to each variation of the load. At 98.0%, where the load is still insufficiently reduced, the total generation from non-slack generators is less than the total load and system losses. Therefore, the resulting dispatch at the slack generator is 2502.6 MW, which is significantly higher than the original value of 437.38 MW from the PCM result. As the load further decreases, the dispatch of the slack generator decreases. When load ratio is 96.625%, the difference of the dispatch of the slack generator from the original 437.38 MW is within the chosen tolerance δ of 10 MW. The first step of the DC-to-AC power flow conversion ends with the corresponding AC-converged power flow case at this load level.

TABLE 3

| Power dispatch of the slack generator when load is iteratively increased | |
| --- | --- |
| Load ratio compared to the original load (%) | Power dispatch of the slack generator (MW) |
| 98.000 | 2502.6 |
| 97.153 | 1211.5 |
| 96.835 | 738.3 |
| 96.707 | 549.5 |
| 96.655 | 472.5 |
| 96.633 | 440.8 |
| 96.625 | 427.8 |

Step 3: In this step, voltage violations are reduced or eliminated using the existing and additional shunts. Only buses with rated voltage higher than 230 kV are checked and resolved, because improving voltage at buses with lower voltage ratings is less helpful. The acceptable voltage range considered in this study is 0.85 p.u to 1.15 p.u. In addition, a bus is considered to have voltage violation if the voltage magnitude at this bus is outside the range [0.85, 1.15] pu.

As shown in Table 4, after the AC power flow convergence is obtained from Step 2, Buses X1, X2, and X3 are identified as having overvoltage, while Bus X4 has undervoltage.

TABLE 4

| | | Rated voltage (kV) | Voltage (pu) | Required reactive power (Mvar) |
|---|---|---|---|---|
| Stage | Bus number | | | |
| 1 | X1 | 500 | 1.18 | −288.26 |
| | X2 | 500 | 1.17 | Not processed |
| | X3 | 500 | 1.16 | Not processed |
| | X4 | 230 | 0.76 | Not processed |
| 2 | X4 | 230 | 0.76 | 1483 Mvar |

Voltage violations at hour 4935 and how shunts eliminate them

Figure 7:
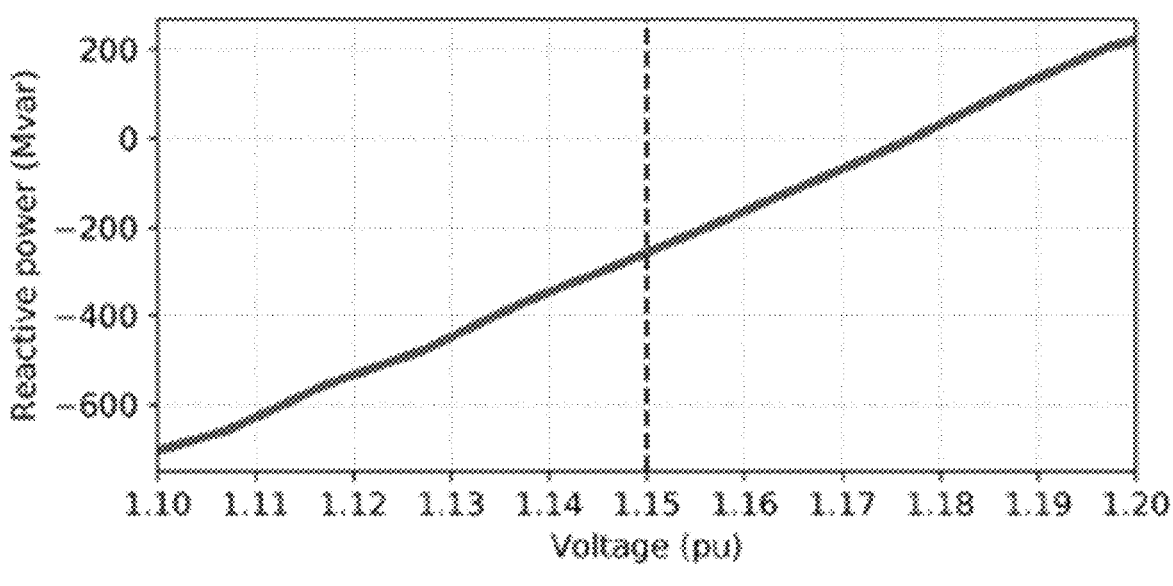
FIG. 7 is a graph of the result of Q-V analysis for bus X1 in a case study example.

In Stage 1, Q-V analysis is performed for Bus X1, which has the highest voltage violation. As shown in FIG. 7 and Table 4, 281.33 Mvar must be absorbed at this bus to reduce the voltage from 1.18 pu to 1.15 pu. As shown in FIGS. 5-6, the algorithm searches for nearby shunts. However, no shunts are available near this bus. Therefore, an additional shunt inductor with a rating of 212.73 Mvar is added to this bus, as shown in Table 5.

TABLE 5

Additional shunts at hour 4935

| Step | Bus number | Action |
|---|---|---|
| 1 | X1 | Add a shunt with Q = −288.26 Mvar |

At Stage 2, power flow is solved again, and indicates that the overvoltage problem is completely resolved with the additional shunt at Bus X1. However, the undervoltage issue at Bus X4 remains. Q-V analysis is performed and determines that 1483 Mvar must be injected into the system at this bus to resolve the voltage violation. Existing shunts are available at this bus and several nearby buses. Based on the status of the shunts at these locations, the reactive power absorbed by the shunt reactor at Bus X4 must be reduced from 4150 Mvar to 2384 Mvar, as shown in Table 6.

TABLE 6

Actions on existing shunts at hour 4935

| Stage | Bus number | Action |
|---|---|---|
| 2 | X4 | From −4150 Mvar to −2384 Mvar |

Figure 8:
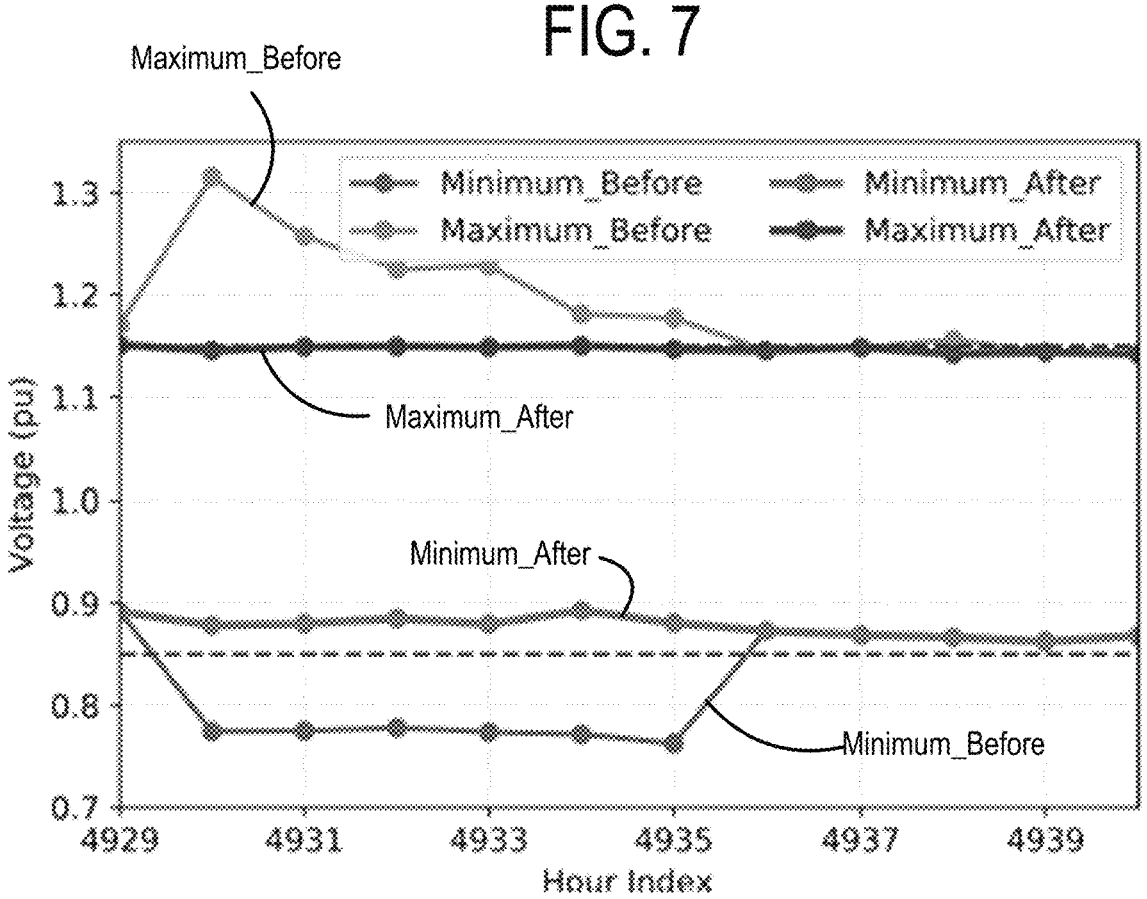
FIG. 8 is a graph showing minimum and maximum load voltages for one-week simulation case study.

FIG. 8 shows the minimum and maximum voltages at all buses with rating voltages of 230 kV or more for 12 hours simulation results. There are significant overvoltage and undervoltage violations in the AC-converged power flow cases obtained after Step 2 in FIG. 5, i.e., before shunts are added or modified. However, such voltage violations are eliminated after existing switched shunts are modified and additional shunts are added to the system.

It is important to note that the level of reactive adjustment discussed above depends on cases and the corresponding voltage violation after we get the convergence at the end of Step 2 in FIG. 5. It is observed that the overvoltage problem is more serious than the undervoltage problem. For all tested cases, 58 overvoltage buses require additional inductors with an average of −267.9 Mvar and the rated values between 1,400 MVar and −2.6 Mvar. On the other hand, only 2 undervoltage buses require additional capacitors with an average of 828.5 Mvar and the rated values between 565 Mvar and 1,100 Mvar.

The performance of the proposed framework are shown in Table 7. There is 89.4% of the tested cases in which the proposed method is successful to get the convergence. In these converged cases, 51.9% of the cases does not need any adjustment of existing var resources as the voltage is within the required range. There are cases in which several adjustments are required to resolve the voltage violations. For example, a switched shunt located at or nearby a bus with voltage violations turns off all or several capacitor banks. Finally, there is 6.5% cases in which the voltage violations cannot be resolved by the existing resources, and additional inductors and capacitors are needed. As shown, 10.6% of cases cannot reach convergence. In some examples, in response to a convergence difficulty observed during a convergence iteration, outputs of a converged AC PFM obtained from an alternative source different from the previous PCM time step can be used, e.g., by comparing a time stamp or other characteristic to other converged AC PFMs and selecting a converged AC PFM with related characteristics.

TABLE 7

Summary of performance of case study

| Stage | Percentage |
|---|---|
| Percentage of cases converged without any adjustment | 51.9% |
| Percentage of cases converged only by adjusting existing var resources | 31.0% |
| Percentage of cases converged with additional var resources | 6.5% |
| Percentage of cases converged that cannot get convergence | 10.6% |

This paper presents procedures for converting DC power flow from PCM results to an AC-converged power flow case to overcome challenges in generating chronological AC power flow cases using PCM simulation data for various operating conditions. In this process, achieving converged AC power flow is crucial, and must be handled by proper reactive power planning. This paper proposes an approach to maintain voltage within acceptable range in large, interconnected systems through reactive power planning. All these procedures are integrated into an automation tool to create chronological AC power flow cases automatically with minimal manual intervention. The procedure is illustrated for an example WECC 2028, 22,000-bus system. But it can be applied to systems with multiple AC and DC grids of any grid topology. Future research will aim to improve the reactive power planning procedure and develop dynamic models for use in transient stability studies.

General Considerations

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Figure 9:
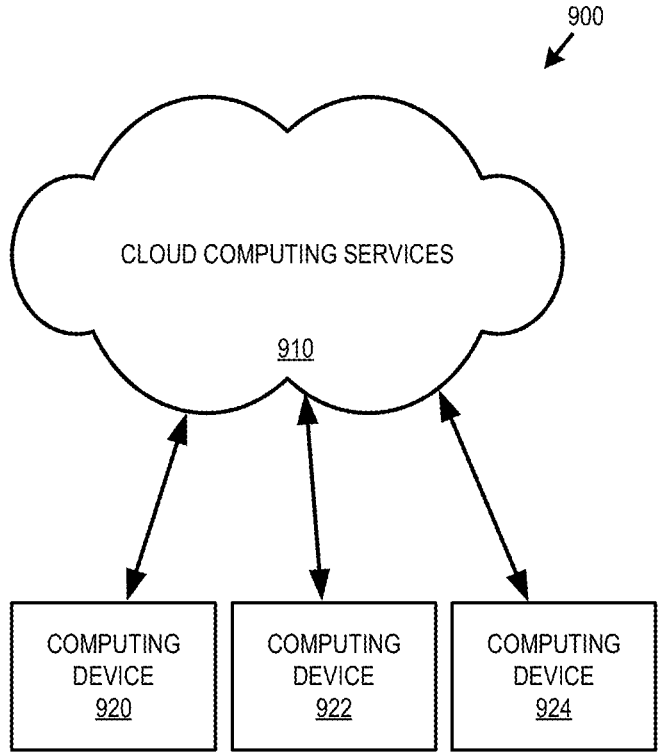
FIG. 9 is schematic of an example cloud computing environment that can be used in conjunction with the technologies described herein.

FIG. 9 depicts an example cloud computing environment 900 in which the described technologies can be implemented. The cloud computing environment 900 includes cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries). The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices, including those part of or connected to power grid systems or power grid analysis equipment. For example, the computing devices (e.g., 920, 922, and 924) can utilize the cloud computing services 910 to perform computing operations (e.g., data processing, data storage, and the like).

Figure 10:
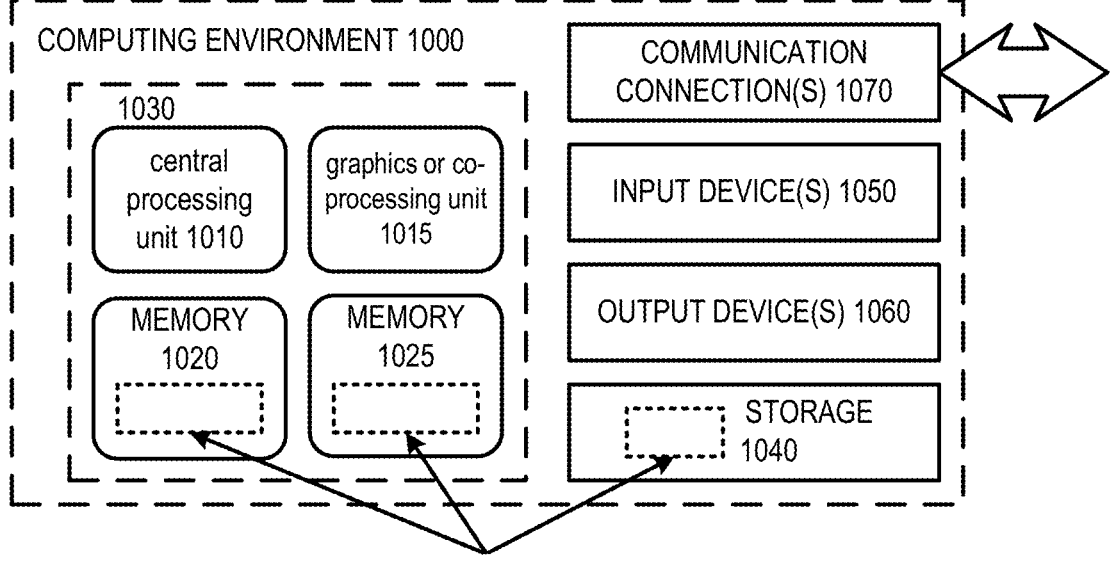
FIG. 10 is a schematic of an example computing system in which some described examples can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of the computing environments of, or providing the data (e.g., PCM and/or chronological PFMs) outputs shown in, FIGS. 1-9, described above. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Described algorithms may be, for example, embodied as software or firmware instructions carried out by a digital computer. For instance, any of the disclosed PCMs, PFMs, numerical analyses, and/or automation techniques can be performed by one or more a computers or other computing hardware that is part of a power grid automation tool. The computers can be computer systems comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid state drives (e.g., Flash drives)). The one or more processors can execute computer-executable instructions stored on one or more of the tangible, non-transitory computer-readable media, and thereby perform any of the disclosed techniques. For instance, software for performing any of the disclosed embodiments can be stored on the one or more volatile, non-transitory computer-readable media as computer-executable instructions, which when executed by the one or more processors, cause the one or more processors to perform any of the disclosed techniques or subsets of techniques. The results of the computations can be stored in the one or more tangible, non-transitory computer-readable storage media and/or can also be output to the user, for example, by displaying, on a display device, PCM data and/or chronological power flow model outputs.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used. In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. A computer-implemented method, comprising:

extending simulation results and input data of a DC production cost model (PCM) of a power grid to an initial AC power flow model (PFM) using a generation distribution mapping and load distribution mapping of a related PFM base example associated with the PCM; and automatically producing a chronological series of converged AC PFM solutions associated with a PCM time series by, for each time step of the PCM time series:

(i) updating inputs of an AC PFM using (a) PCM results of the current time step and (b) solution outputs of a converged AC PFM obtained from a previous PCM time step, and (ii) iteratively, reducing nodal loads by a gradual amount configured to account for power grid power flow losses unaccounted for by the PCM and performing AC PFM numerical analyses, until: (a) an AC PFM convergence is obtained and (b) a real power generation slack bus is less than or equal to a predefined tolerance in relation to a slack bus of the PCM results of the current time step;

wherein the automatically producing the chronological series of AC PFM solutions associated with a PCM time series by, for each time step of the PCM time series, further comprises, in response to the converged AC PFM: scanning all bus voltages to identify voltage violations, and for each voltage violation, identifying existing shunts at corresponding or nearby buses and adjusting dispatch of the identified shunt devices based on a level of the voltage violation and step sizes of the identified shunt devices to reduce or eliminate the voltage violation;

and further comprising, for voltage violations remaining after identification and adjustment of existing shunts, identifying locations and sizes of shunts to be added to the power grid by performing a Q-V analysis configured to show sensitivity and variation of bus voltages with respect to reactive power injections or absorptions.

2. The method of claim 1, wherein the identifying locations and sizes of shunts to be added to the power grid by performing a Q-V analysis comprises:

arranging remaining unresolved voltage violations in descending order; and for each voltage violation beginning with top, performing Q-V analysis to determine $Q_{TOT}$ required to reduce alleviate voltage violation, adjust nearby shunts based on QTOT, and add new shunts if $Q_{TOT}$ is nonzero after shunt adjustments.

3. The method of claim 1, wherein the extending simulation results and input data of the PCM to the PFM comprises:

disaggregating power generation and load from a power plant level and balancing authority level, respectively, to the nodal level of the PFM; and updating the PFM at a nodal level (i) by sending unit commitment and economic dispatch for generation units, high voltage, direct current (HVDC) dispatch, transformer phase angles, and transmission line status from the PCM simulation results to PFM nodes according to the generation distribution mapping and (ii) by sending balancing authority load data to PFM nodes according to the load distribution mapping.

4. The method of claim 3, wherein the updating the PFM at a nodal level by sending PCM simulation results to PFM nodes according to the generation distribution mapping includes, with the status of each unit of the PFM for a plant i being similar to the status of the power plant i in the PCM simulation results, calculating unit dispatch for each unit k in plant i from plant dispatch and updating the PFM nodes using a constant generation distribution factor (GDF), where (GDF) is calculated from a dispatch provided in the PFM base example.

5. The method of claim 4, wherein the updating the PFM at a nodal level by sending PCM simulation results to PFM nodes according to the load distribution mapping includes calculating nodal load data in the PFM using balancing authority load data from the PCM using a load distribution factor calculated from a nodal load value mapping in the PFM base example.

6. The method of claim 1, wherein a reactive power in the PFM is calculated such that the power factor of the nodal loads in the PFM are equal to the PFM base example so as to compensate for a lack of information about the reactive part of the nodal loads in the PCM.

7. The method of claim 1, comprising, after the extending simulation results and input data of the PCM to the PFM, verifying a consistency between parameters of the PCM and the PFM by confirming a one-to-one match for transmission line ID, status, and/or rating for any transmission lines in the PCM and PFM.

8. The method of claim 1, wherein the iteratively reducing nodal loads by a gradual amount until a real power generation slack bus is less than or equal to a predefined tolerance in relation to a slack bus of the PCM results of the current time step includes using an adaptive step size configured to reduce the amount of reduction in the nodal loads for the next iteration to assist with simultaneously satisfying convergence and the slack bus condition.

9. The method of claim 1, wherein the PCM is configured to simulate a chronological security-constrained unit commitment and economic dispatch for an electrical power grid over the PCM time series, and to produce an optimization output of a lowest-cost generation dispatch that satisfies a set of constraints;

wherein the constraints include power generator constraints including minimum/maximum capacity, ramp rate, heat rate, down/up time limits, and/or fuel limit, network constraints including minimum/maximum bus voltage and/or line flow limit, operational constraints including stability limits, and/or environmental constraints including emission limits.

10. The method of claim 9, wherein inputs to the PCM include load forecast, wind forecast, solar forecast, generator fleet characteristics, fuel prices, network topology, and/or the set of constraints.

11. The method of claim 10, wherein outputs of the PCM include chronological production and associated cost, locational marginal price, and/or congestion cost, in an hourly and/or sub-hourly time-series.

12. The method of claim 1, wherein the PFM comprises a numerical analysis having inputs including real and reactive power load, generator real power, and bus voltage magnitude, and having outputs including bus voltage magnitudes and angles so as to provide a solution with detailed transmission voltages and power flows based on the specified inputs.

13. The method of claim 1, further comprising updating network topology used in the PCM based on a network topology change determined from the PFM time series generated for the PCM.

14. The method of claim 1, further comprising, in response to a convergence difficulty observed during the iteration, updating inputs of the AC PFM using (a) PCM results of the current time step and (b) solution outputs of a converged AC PFM obtained from an alternative source different from the previous PCM time step.

15. The method of claim 14, wherein the alternative source comprises a converged PFM selected from a set of converged PFM examples.

16. The method of claim 1, further comprising, before automatically producing the chronological series, verifying a consistency between the PCM and the PFM by comparing a DC power flow of the PCM simulation results to the PFM, by comparing line flow values.

17. A computer-implemented automated tool, comprising:
    a processor and memory configured with instructions for the processor which cause the processor to perform the automated method of claim 1.

18. A computer readable medium comprising stored processor executable instructions configured to perform the method of claim 1.

19. A computer-implemented method, comprising:
    extending simulation results and input data of a DC production cost model (PCM) of a power grid to an initial AC power flow model (PFM) using a generation distribution mapping and load distribution mapping of a related PFM base example associated with the PCM; and
    automatically producing a chronological series of converged AC PFM solutions associated with a PCM time series by, for each time step of the PCM time series:
    (i) updating inputs of an AC PFM using (a) PCM results of the current time step and (b) solution outputs of a converged AC PFM obtained from a previous PCM time step, and
    (ii) iteratively, reducing nodal loads by a gradual amount configured to account for power grid power flow losses unaccounted for by the PCM and performing AC PFM numerical analyses, until: (a) an AC PFM convergence is obtained and (b) a real power generation slack bus is less than or equal to a predefined tolerance in relation to a slack bus of the PCM results of the current time step;
    wherein the automatically producing the chronological series of AC PFM solutions associated with a PCM time series by, for each time step of the PCM time series, further comprises, in response to the converged AC PFM: scanning all bus voltages to identify voltage violations, and for each voltage violation, identifying existing shunts at corresponding or nearby buses and adjusting dispatch of the identified shunt devices based on a level of the voltage violation and step sizes of the identified shunt devices to reduce or eliminate the voltage violation;
    wherein the extending simulation results and input data of the PCM to the PFM comprises:
    disaggregating power generation and load from a power plant level and balancing authority level, respectively, to the nodal level of the PFM; and updating the PFM at a nodal level (i) by sending unit commitment and economic dispatch for generation units, high voltage, direct current (HVDC) dispatch, transformer phase angles, and transmission line status from the PCM simulation results to PFM nodes according to the generation distribution mapping and (ii) by sending balancing authority load data to PFM nodes according to the load distribution mapping.

20. A computer-implemented method, comprising:

extending simulation results and input data of a DC production cost model (PCM) of a power grid to an initial AC power flow model (PFM) using a generation distribution mapping and load distribution mapping of a related PFM base example associated with the PCM; and automatically producing a chronological series of converged AC PFM solutions associated with a PCM time series by, for each time step of the PCM time series:

(i) updating inputs of an AC PFM using (a) PCM results of the current time step and (b) solution outputs of a converged AC PFM obtained from a previous PCM time step, and (ii) iteratively, reducing nodal loads by a gradual amount configured to account for power grid power flow losses unaccounted for by the PCM and performing AC PFM numerical analyses, until: (a) an AC PFM convergence is obtained and (b) a real power generation slack bus is less than or equal to a predefined tolerance in relation to a slack bus of the PCM results of the current time step;

wherein the automatically producing the chronological series of AC PFM solutions associated with a PCM time series by, for each time step of the PCM time series, further comprises, in response to the converged AC PFM: scanning all bus voltages to identify voltage violations, and for each voltage violation, identifying existing shunts at corresponding or nearby buses and adjusting dispatch of the identified shunt devices based on a level of the voltage violation and step sizes of the identified shunt devices to reduce or eliminate the voltage violation;

wherein after the extending simulation results and input data of the PCM to the PFM, further comprising verifying a consistency between parameters of the PCM and the PFM by confirming a one-to-one match for transmission line ID, status, and/or rating for any transmission lines in the PCM and PFM.

21. A computer-implemented method, comprising:

extending simulation results and input data of a DC production cost model (PCM) of a power grid to an initial AC power flow model (PFM) using a generation distribution mapping and load distribution mapping of a related PFM base example associated with the PCM; and automatically producing a chronological series of converged AC PFM solutions associated with a PCM time series by, for each time step of the PCM time series:

(i) updating inputs of an AC PFM using (a) PCM results of the current time step and (b) solution outputs of a converged AC PFM obtained from a previous PCM time step, and (ii) iteratively, reducing nodal loads by a gradual amount configured to account for power grid power flow losses unaccounted for by the PCM and performing AC PFM numerical analyses, until: (a) an AC PFM convergence is obtained and (b) a real power generation slack bus is less than or equal to a predefined tolerance in relation to a slack bus of the PCM results of the current time step;

wherein the automatically producing the chronological series of AC PFM solutions associated with a PCM time series by, for each time step of the PCM time series, further comprises, in response to the converged AC PFM: scanning all bus voltages to identify voltage violations, and for each voltage violation, identifying existing shunts at corresponding or nearby buses and adjusting dispatch of the identified shunt devices based on a level of the voltage violation and step sizes of the identified shunt devices to reduce or eliminate the voltage violation;

where, in response to a convergence difficulty observed during the iteration, further comprising updating inputs of the AC PFM using (a) PCM results of the current time step and (b) solution outputs of a converged AC PFM obtained from an alternative source different from the previous PCM time step.

22. A computer-implemented method, comprising:

extending simulation results and input data of a DC production cost model (PCM) of a power grid to an initial AC power flow model (PFM) using a generation distribution mapping and load distribution mapping of a related PFM base example associated with the PCM; and automatically producing a chronological series of converged AC PFM solutions associated with a PCM time series by, for each time step of the PCM time series:

(i) updating inputs of an AC PFM using (a) PCM results of the current time step and (b) solution outputs of a converged AC PFM obtained from a previous PCM time step, and (ii) iteratively, reducing nodal loads by a gradual amount configured to account for power grid power flow losses unaccounted for by the PCM and performing AC PFM numerical analyses, until: (a) an AC PFM convergence is obtained and (b) a real power generation slack bus is less than or equal to a predefined tolerance in relation to a slack bus of the PCM results of the current time step;

wherein the automatically producing the chronological series of AC PFM solutions associated with a PCM time series by, for each time step of the PCM time series, further comprises, in response to the converged AC PFM: scanning all bus voltages to identify voltage violations, and for each voltage violation, identifying existing shunts at corresponding or nearby buses and adjusting dispatch of the identified shunt devices based on a level of the voltage violation and step sizes of the identified shunt devices to reduce or eliminate the voltage violation;

wherein, before automatically producing the chronological series, further comprising verifying a consistency between the PCM and the PFM by comparing a DC power flow of the PCM simulation results to the PFM, by comparing line flow values.

* * * * *